O. KAMPFE.
TRAP FOR ANIMALS.
APPLICATION FILED MAR. 7, 1911.
1,033,761.
Patented July 23, 1912.
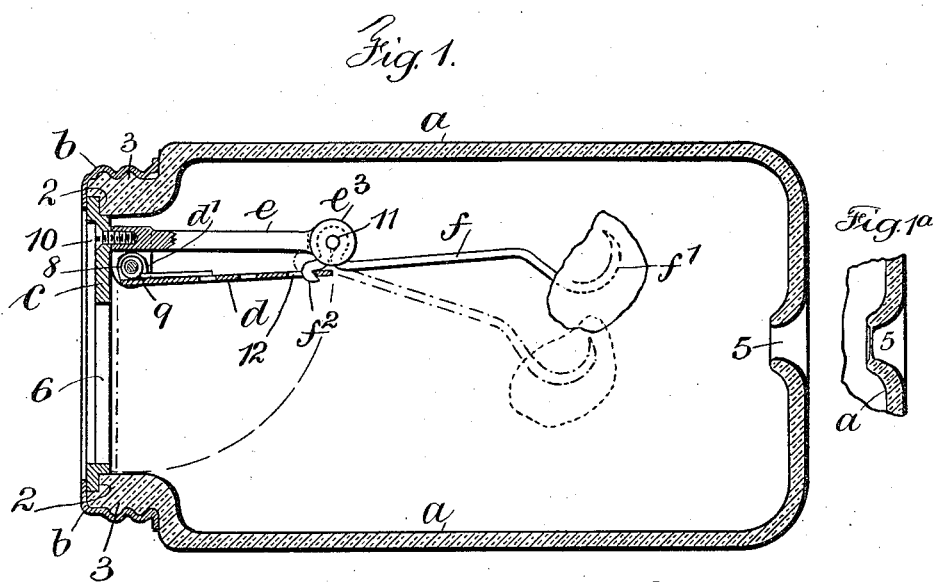
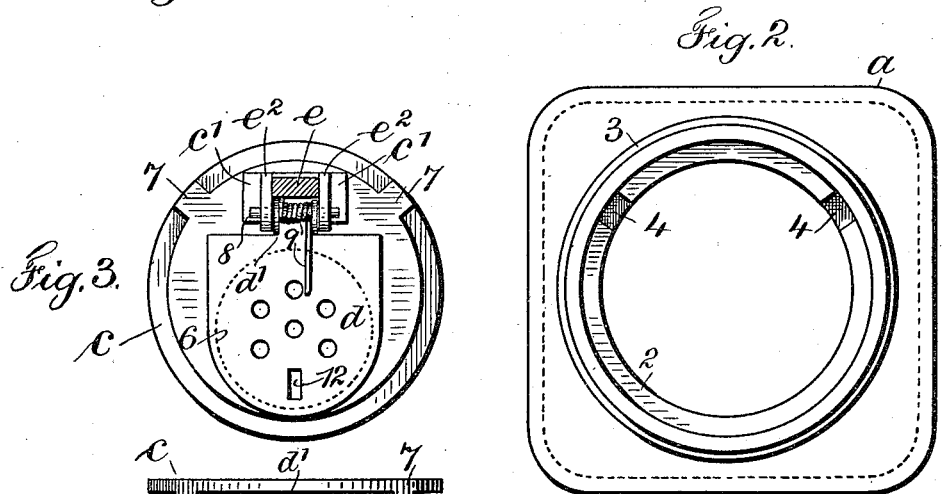
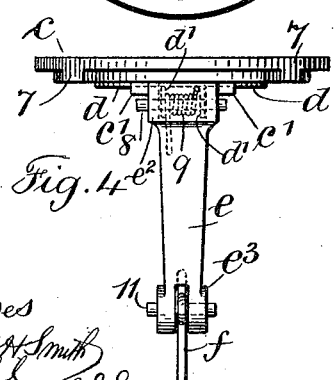
Witnesses
Chas H Smith
A. H. Serrell
Inventor
Otto Kampfe.
by Harold Serrell
his atty.
COLUMBIA PLANOGRAPH CO., WASHINGTON, D. C.

UNITED STATES PATENT OFFICE.

OTTO KAMPFE, OF NEW YORK, N. Y.

TRAP FOR ANIMALS.

1,033,761.   Specification of Letters Patent.   Patented July 23, 1912.

Application filed March 7, 1911. Serial No. 612,900.

*To all whom it may concern:*

Be it known that I, OTTO KAMPFE, a citizen of the United States, residing in the borough of Brooklyn, in the county of Kings, city and State of New York, have invented an Improvement in Traps for Animals, of which the following is a specification.

My invention is designed as an improvement upon the device shown and described in Letters Patent of the United States granted to me June 8, 1909, No. 924,237, and the same relates to a trap of special form and improved construction for catching small animals such as *Rodentia myomorpha* and especially rats and mice.

The object of my invention is to simplify and make more efficient the construction and reduce the cost whereby the device of my invention is rendered more commercial.

In carrying out my invention, the glass jar as a main portion of the trap is made with one or more flat faces arranged longitudinally for support and the mouth of the jar is preferably off-set or shouldered, with spaced locating recesses. I also prefer in the end of the jar opposite the mouth to provide a hole for the circulation of air as an adjunct to the successful employment of the trap, as rats and mice will not readily enter any compartment where there is no circulation of air. The periphery of the jar end at the mouth is provided with a thread and screw ring to extend over the edge of a cover preferably of thin cast metal. The periphery of this cover is off-set to fit the jar mouth and has lugs to enter the recesses therein. The cover has a circular aperture for the animal to enter by, which is closed by a disk door of sheet metal, spring-actuated. Connected to the cover is an arm with a thick base and lugs and a wire bait carrier is connected to the free end of the arm and provided with a prong for the bait and a latch to engage and hold open the disk door in setting the trap.

In the drawing, Figure 1 is a longitudinal section through the device of my invention. Fig. 1ª is a part thereof hereinafter more fully described. Fig. 2 is an elevation of the jar at the mouth end. Fig. 3 is an elevation of the cover and disk door from the inside and a section of the arm. Fig. 4 is a plan of these parts but with the arm complete, and Fig. 5 is a front elevation of a jar or body of modified construction.

The jar bodies $a$ and $a^1$ shown in the drawings are preferably of glass. The body shown in Figs. 1 and 2 is substantially square in cross section with rounded corners so that there are flat longitudinal faces for the support of the jar. The jar body $a^1$ shown in Fig. 5 is substantially semi-circular in cross section with one flat face on one side as a support. With both of these jar bodies the mouth is the same, namely, round and shouldered or off-set at 2 and screw-threaded around the periphery or neck which incloses the mouth, and in the shouldered part there are recesses 4 preferably two in number and located at about the places shown in Fig. 2, and I employ a screw ring $b$ to fit over the neck or neck periphery of the jar body and with a flange to extend over the edge of the cover $c$. This cover $c$ has a flange or off-set periphery and a central aperture at 6 through which the animal entering the trap is admitted. The periphery of the cover $c$ fits into the neck of the jar body; the off-set thereof coinciding with the off-set in the neck of the jar body, and the cover periphery on the under surface at the off-set portion is provided with lugs 7 adapted to fit the recesses 4 in the neck of the jar body. These lugs and recesses locate the cover with reference to the position occupied by the jar body so that the cover always comes to the same position, and when the cover is in place in the neck of the jar body, the screw ring $b$ is brought into position and its flange coming outside of the periphery of the cover over the face as shown in Fig. 1, holds the same securely in position, but in such a position as to be readily removable with the unscrewing of the ring $b$. There are lugs $c^1$ cast with and up the back of the cover $c$.

I provide a disk door $d$ of sheet metal preferably perforated but the perforations are made in any desired manner either as shown in Fig. 3 by a number of holes, or as shown in my patent aforesaid. These perforations form no part of my present invention. This disk door is provided with lugs $d^1$. I also provide an arm $e$ preferably of thin suitable cast metal like the cast metal of the cover $c$ and said arm is provided with a thick base and integral lugs $e^2$ and an integral forked end $e^3$ and the same is preferably secured in position to the back of the cover $c$ between the lugs $c^1$ which act as locating guides by a securing screw 10 and in this position the arm *e* extends into the jar body, and I provide a pivot pin 8 to pass through the lugs $d^1$ of the disk door *d* and through the lugs $e^2$ of the arm *e* so as to connect said parts in a pivotal relation which will permit the disk door *d* to swing upon the pin 8. I also provide a helical spring 9 located around the pivot pin 8 between the lugs $d^1$ of the door and with the respective ends thereof out-turned to bear upon the under surface of the arm *e* and the back surface of the door *d*; the tendency of the spring ends to come into line forcing the disk door *d* shut and holding the same shut against the inner surface of the cover *c*. I provide a pin 11 passing preferably centrally across through the forked end $e^3$ of the arm *e* and a wire bait carrier *f* having a prong $f^1$ for the bait and a latch $f^2$. This wire *f* is bent as shown in Fig. 1 to pass between the parts of the forked end $e^3$ and over the pin 11; the prong $f^1$ passing along in the jar body and the latch $f^2$ extending downward so as to engage a slot 12 in the lower portion of the disk door and hold the same in the full line position Fig. 1, where the door is raised and access to the trap provided.

In Fig. 1 a dotted position of the bait and of the arm *e* is shown which is the position occupied by said parts when the door *d* has been released by an animal in the trap getting at the bait, while the full line position is that of the latch door set. I have also shown a hole 5 made in the back or rear end of the jar body. This in the blowing of the glass is preferably made of the form illustrated in Fig. $1^a$, in which a thin web of glass is left by the mold in which the jar is blown and this thin web of glass is afterward knocked out with any suitable instrument and the rough edges may be taken off. I provide this hole in the jar body for the reason that it, with the perforation in the disk door, provides for a circulation of air in the trap as an adjunct to the successful employment of the trap, for I have noticed and have understood that rats and mice will not readily enter any compartment where there is no circulation of air and any trap to catch such animals and be successful must provide for a circulation of air, as the instinct of these animals appears to indicate that places where the air is confined, does not circulate and is perhaps not entirely fresh is a place to be suspicious of.

I do not limit my invention to the material from which the jar body is formed, although I prefer to make the same of glass and of crystal-glass for the visual indication of the presence of the animal that is caught in the trap, and I do not limit my invention to the shape of the jar body. I also do not limit my invention to the material of which the cover *c* and arm *e* and integral parts thereof are made, as any suitable metal may be sufficient. The perforation in the disk door *d* as well as the circular aperture in the cover and the hole 5 in the rear end of the jar body provide for the ingress of water in drowning the animal caught in the trap and whereby the trap and the animal caught can be immersed in a body or pail of water and the jar at once filled with water and the animal drowned.

I do not limit myself to the shape of the vessel or to the face thereof provided with an opening or mouth to receive the cover member, as these features, *per se*, form no necessary part of my invention.

I claim as my invention:

1. In an animal trap, the combination with a cover and a screw-ring adapted to fit around the neck of the jar and extend over the edge of the cover to hold the same in position, an arm and means for connecting the same to the inner surface of said cover, a wire bait-carrier pivotally mounted to the free end of said arm, a perforated disk door spring-actuated and means for pivotally connecting the same adjacent to the union of the cover and said arm, and means formed part in the disk-door and part on said arm whereby the disk-door is engaged and held open when the trap is set.

2. In an animal trap the combination with a cover apertured and having spaced lugs $c^1$ formed therewith and on the inner surface, of an integral member comprising an arm, a thick base and perforated lugs fitting between the lugs $c^1$, a screw passing therein from the face of the cover securing said parts together, a wire bait-carrier and means for pivotally connecting the same at the free end of said arm.

3. An animal trap comprising a jar body having a circular mouth and offset and the neck portion around the mouth provided with a peripheral screw-thread, a cover having an off-set periphery and adapted to fit in said mouth in the off-set portion thereof and a screw ring adapted to fit around the neck of the jar and extend over the edge of the cover to hold the same in position, an integral member comprising an arm, a thick base and lugs and which latter are perforated, means for securing said member at the thick base to the cover upon the inner surface thereof so that the arm when the cover is in place projects into the jar body, a perforated disk door having lugs and the lugs thereof adapted to fit between the aforesaid lugs, a pivot pin passing through all of the lugs and a helical spring around said pivot pin between said lugs, with one end bearing upon the disk door and the other end upon the under surface of said arm, a wire bait carrier pivotally connected to the free end of said arm and having a bait-holding prong on one end and a latch hook on the other end, the latter adapted to enter a slot in the disk door for the purpose of holding the same open when the trap is set.

4. In an animal trap the combination with a cover apertured and having spaced lugs $c^1$ formed therewith and on the inner surface, of an integral member comprising an arm, a thick base and perforated lugs fitting between the lugs $c^1$, a screw passing therein from the face of the cover securing said parts together, a disk door having perforated lugs and the same fitting between the perforated lugs of the said integral member, a pivot pin passing through said lugs, a spring for holding said door against the cover, and means for carrying the bait and acting simultaneously to hold up the disk door open.

Signed by me this 1st day of March, 1911.

OTTO KAMPFE.

Witnesses:
A. H. SERRELL,
E. ZACHARIASEN.

Copies of this patent may be obtained for five cents each, by addressing the "Commissioner of Patents, Washington, D. C."